Figure 1:
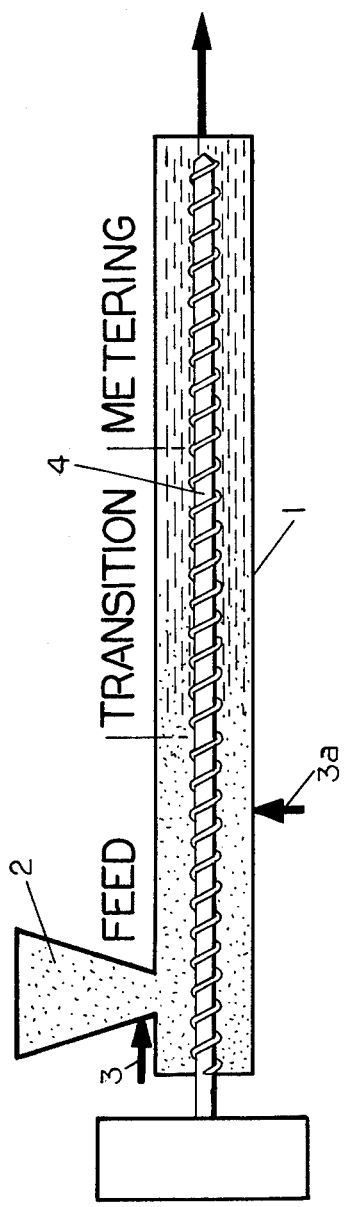

United States Patent [19]

Jabarin et al.

[11] 4,142,040
[45] Feb. 27, 1979

[54] PROCESSING POLYESTERS TO MINIMIZE ACETALDEHYDE FORMATION

[75] Inventors: Saleh A. Jabarin, Sylvania; Elizabeth A. Lewis, Waterville, both of Ohio

[73] Assignee: Owens-Illinois, Inc., Toledo, Ohio

[21] Appl. No.: 898,364

[22] Filed: Apr. 21, 1978

[51] Int. Cl.² ............................................. C08G 63/70
[52] U.S. Cl. .................................. 528/502; 264/87; 264/176 F; 528/272; 528/480
[58] Field of Search ...................... 528/502, 480, 272; 264/87, 176 F

[56] References Cited

U.S. PATENT DOCUMENTS

| 3,846,377 | 11/1974 | Siegmann | 264/176 F X |
| 4,072,663 | 2/1978 | Pendlebury | 264/176 F X |

Primary Examiner—Lucille M. Phynes
Attorney, Agent, or Firm—Charles S. Lynch; M. E. Click; D. H. Wilson

[57] ABSTRACT

During thermal processing of saturated polyesters in the molten state gaseous oxygen is excluded and as a result acetaldehyde formation is minimized.

4 Claims, 1 Drawing Figure

PROCESSING POLYESTERS TO MINIMIZE ACETALDEHYDE FORMATION

This invention relates to a method for the thermal treatment or processing of saturated polyester compositions, having

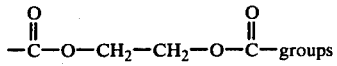

in the molten state to minimize decomposition during processing to yield chiefly acetaldehyde. The present invention reduces the acetaldehyde generation rate.

The term "saturated polyester" encompasses a wide variety of materials which are of significant industrial and economic importance. Well-known polyester materials include polyester fibers, polyester tire cord, plasticizers, alkyds and polyester molding resins suitable for extrusion, injection and blow molding plastic articles.

For the purposes of this invention it is intended to include those saturated polyesters having linear chain-like structures, which include in their backbone

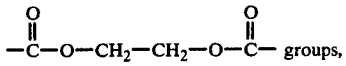

derived by reacting compounds such as dicarboxylic acids or their acid functioning derivatives with dihydric alcohols, including ethylene glycol; and those polyesters having cross-linked, three dimensional structures derived by reacting di- or poly-carboxylic acids with diols and polyols, always including a significant portion of ethylene glycol; said polyesters or copolyesters may contain alkyl or aryl or cycloalkyl or other groups which are not ethylenically unsaturated. The end valences of said

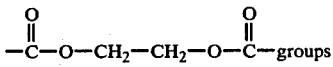

are of course bonded to carbon atoms as will be understood.

It is well-known to those skilled in the art that most polyesters are relatively stable materials as compared with other types of polymers, e.g., polyvinyl acetate, polystyrene, polyurethanes, etc. It is also well-known, however, that when saturated polyesters are exposed to high temperatures, as they often must be during processing and application from the molten state, they tend to degrade with detrimental loss of physical and chemical properties. This condition often results in inferior products at best, or worse, it renders these materials useless in the intended application thereby contributing to substantial economic losses to manufacturer and end-user alike.

More specifically, with the growing use of plastic bottles for beverages such as carbonated soft drinks and beer it has been found to be important that the container wall have a low concentration of acetaldehyde; otherwise, the taste of the beverage is deleteriously affected and the container cannot be used. In particular, the invention is useful in processing molten poly(ethylene terephthalate) resins widely used for bottles for packaging carbonated soft drinks; such polymers contain in their polymer backbone a major weight portion of ethylene terephthalate units of the structure

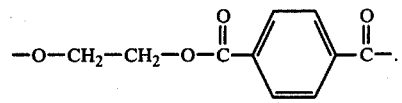

It is an object of the present invention to provide a method for processing in the molten state a saturated polyester resin containing

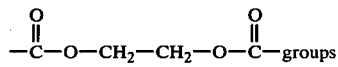

so as to minimize degradation to yield acetaldehyde.

Other objects, features and advantages of the invention will become apparent upon a study of the accompanying disclosure.

According to the present invention there is provided a process whereby the rate of formation of acetaldehyde during thermal processing of a saturated polyester, containing

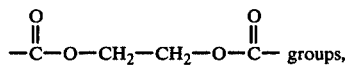

is decreased by essentially excluding elemental oxygen gas from said polyester during said thermal processing.

During physical processing of polyesters in the hot, molten state to shape the polymer into a final product or even an intermediate shape such as a parison, it is known that the decomposition results in the formation of various degradation products. In processing or working of molten polyester resins such as in a screw extruder there is normally no attempt made to control the atmosphere, so air containing oxygen is normally present.

It is known that thermal degradation of poly(ethylene terephthalate) under the influence of heat alone results in various phenomena, including some reduction in molecular weight, some discoloration and also the evolution of volatile products, chiefly acetaldehyde.

Degradation of poly(ethylene terephthalate) at elevated temperatures in the presence of air or oxygen is called thermaloxidative degradation and has also been studied in the laboratory. It is known to lead to some similar results such as some reduction in molecular weight but also to have different effects such as initial formation of water (bringing about hydrolytic degradation effects) and formation of carbon dioxide and carbon monoxide as major volatile products, rather than acetaldehyde.

None of the studies known to me, however, has investigated the relative rate of acetaldehyde formation at a given temperature in an inert atmosphere versus an elemental oxygen-containing atmosphere. I have discovered that less acetaldehyde is formed in the former case, where the atmosphere is inert and contains essentially no oxygen.

U.S. Pat., Van Der Schee No. 3,486,864, issued Dec. 30, 1969, is concerned with a process of increasing the degree of polymerization of poly(ethylene terephthalate) prepolymer to be used for melt spinning filaments, fiber and yarns. In part, the process is concerned with the handling of the usual prepolymer, the lower molecular weight polymer having a lower degree of polymerization than necessary for final extrusion of filaments or the like. The process and apparatus is concerned in particular with the process of further condensing and polymerizing the prepolymer and with minimizing as much as possible formation of free carboxyl end groups by minimizing residence time in the final polymerization apparatus. As to the volatiles that are formed during further polymerization, including excess glycol, a vacuum is suggested to remove its products as fast as possible from the polymer, and alternatively it is suggested that a gas be mixed with the prepolymer before it is heated and melted so that under the influence of the vacuum a flow of inert gas such as nitrogen will be maintained and act to entrain the volatiles and liberate the same from the system.

In contrast, of course, the present process is a method for minimizing formation of the volatile compound acetaldehyde from already completely polymerized polymer while it is being physically worked in the molten condition. The Van Der Schee patent does not even recognize the problem with respect to acetaldehyde.

In U.S. Pat. No. 3,913,796, means are provided in an extruder injection molding for venting various gases such as moisture, air and decomposition products. However, the patent is not concerned with minimizing the formation of decomposition products. Similarly, in U.S. Pat. No. 3,253,303 a vacuum is provided to remove volatile products; polyesters are not mentioned. In U.S. Pat. No. 3,215,760, the apparatus is flushed with nitrogen just before extruding filaments of polyamides. The purpose is to eliminate oxygen because it promotes gel formation when making polyamides; polyesters are not mentioned. U.S. Pat. No. 3,563,514 is concerned with the use of suction to remove volatiles from plastics during processing such as in an extruder; however, no attention is paid to prevention of the formation of volatile decomposition products. U.S. Pat. No. 3,327,034 concerns removing gaseous contaminants from resins, not preventing their formation by decomposition; polyesters are again not mentioned. U.S. Pat. No. 3,657,195 is concerned with venting a screw extruder processing polyamides. Finally, U.S. Pat. No. 4,060,226 concerns a vented injection molding screw extruder processing nylon, wherein means are provided to vent gases and vapors from the screw barrel, simply to produce devolatilized plasticized material.

In the tests summarized in Table 1, 500 milligrams of poly(ethylene terephthalate) pellets were placed in a small aluminum boat. This was placed in a horizontal quartz tube of about 1-inch diameter. The tube was electrically heated and a thermocouple in the polymer in the boat continuously recorded the polymer temperature. A mixture of air and nitrogen, and in some instances, nitrogen alone was passed through the tube horizontally at the rate of 50 cc. (room temperature) per minute for 5 minutes at the given temperature. Of course, at the treatment temperature the polymer is molten. The gas was collected and analyzed by gas chromatography. The results are in weight parts per million per-unit weight of polymer.

Thus, the following Table 1 shows the amount of acetaldehyde generated when held 5 minutes at various melt temperatures in various atmospheres. The poly(ethylene terephthalate) (PET) employed had an inherent viscosity of 0.72 and a melting point of about 260° C. and was dried in vacuum to a content of less than 0.005% moisture before placing in the aluminum boats.

Table 1

Amount of Acetaldehyde (ppm w/w) Generated at Various Melt Temperatures After 5 Minutes of Residence Time for a PET of 0.72 I.V.

| % Oxygen | 0 | 1 | 5 | 10 |
|---|---|---|---|---|
| % Air | 0 | 5 | 25 | 50 |
| Temperature | | ppm(w/w) | | |
| 285° C. | 1.3 | 3.8 | 5.0 | 8.5 |
| 295° C. | 2.5 | 4.0 | 10.0 | 14.0 |
| 300° C. | 3.4 | 7.5 | 16.0 | 20.0 |

The first column shows the results for pure nitrogen with no air or oxygen and the table illustrates how very important it is to keep the $O_2$ content below even 1 volume percent oxygen gas. Thus, even very small amounts of oxygen gas greatly accelerates the formation of acetaldehyde, a fact not recogniged in any prior art of which I am aware.

The "acetaldehyde concentration" is that obtained by dividing the weight of the original polymer sample into the total weight of acetaldehyde found in the vapor phase collected from above the sample. While the acetaldehyde found does not take into account that which is dissolved in the molten polymer, the comparative data nevertheless shows the effectiveness of excluding oxygen in retarding the generation of acetaldehyde.

FIG. 1 is a schematic diagram of a screw extruder for plasticizing, mixing and delivering polyester resins to molding means.

FIG. 1 illustrates an important embodiment of the invention. Particulate molding grade polyester, such as poly(ethylene terephthalate) having an inherent viscosity of 0.72, is delivered to screw extruder 1, having the usual feeding, transition and metering zones, through hopper 2 while screw 4 is turning to advance polymer toward the opposite end of the extruder. An inert gas, such as nitrogen, is introduced through one or more conduits 3 into the bottom of the hopper or through one or more conduits 3a into the feeding zone (or both). The inert gas flushes essentially all air from the polyester as it advances through the initial part of the feeding zone. Polymer is delivered from the exit end of the extruder into molding means, which can be, for instance, an annular die outfitted on the exit end of the extruder to deliver a tubular shape or which can be an injection mold, not shown, to form a desired shaped plastic product. The temperature maintained in the extruder after the polymer becomes molten in the latter part of the feeding zone is for this polymer about 275°–285° C. Acetaldehyde formation is minimized because of the absence of oxygen. Of course, before the initial start-up of the extruder, the entire extruder is preferably flushed with inert gas such as dry nitrogen.

As will be evident to those skilled in the art, various modifications of this invention can be made or followed in the light of the foregoing disclosure and discussion without departing from the spirit and scope of the disclosure or from the scope of the claims.

I claim:

1. In a process for physically processing at elevated temperatures a molten molding grade saturated polyester having

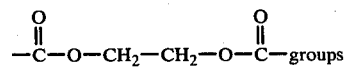

groups in its backbone, the improvement which comprises minimizing acetaldehyde formation by excluding essentially all gaseous elemental oxygen from contact with said polymer including the step of purging oxygen-containing gases from the atmosphere in contact with said polyester by means of an inert gas, before raising the temperature of said polyester to the molten condition and physically working said polyester.

2. The improvement of claim 1 wherein the physical processing of said polyester comprises extrusion in a screw extruder.

3. In a process for physically processing at elevated temperatures a molten molding grade poly(ethylene terephthalate) resin having in the polymer backbone a major weight portion of ethylene terephthalate units of the structure

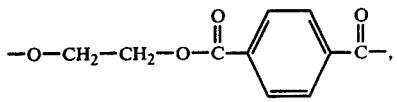

the improvement which comprises minimizing acetaldehyde formation by excluding essentially all gaseous elemental oxygen from contact with said polymer including the step of purging oxygen-containing gases from the atmosphere in contact with said polyester by means of an inert gas, before raising the temperature of said polyester to the molten condition and physically working said polyester.

4. The improvement of claim 1 wherein the physical processing of said resin comprises extrusion in a screw extruder.

* * * * *